(12) United States Patent
Gilbert et al.

(10) Patent No.: US 10,154,414 B2
(45) Date of Patent: Dec. 11, 2018

(54) RESOURCE ALLOCATION

(71) Applicant: METASWITCH NETWORKS LTD., Enfield (GB)

(72) Inventors: George Malcolm Gilbert, Enfield (GB); Ryan Peter Norris, Newbury (GB)

(73) Assignee: METASWITCH NETWORKS LTD., Enfield (GB)

( * ) Notice: Subject to any disclaimer, the term of this patent is extended or adjusted under 35 U.S.C. 154(b) by 0 days.

(21) Appl. No.: 15/637,287

(22) Filed: Jun. 29, 2017

(65) Prior Publication Data
US 2018/0192294 A1  Jul. 5, 2018

(30) Foreign Application Priority Data

Dec. 29, 2016  (GB) .................................. 1622358.8

(51) Int. Cl.
*H04W 16/04* (2009.01)
*H04L 12/801* (2013.01)
*H04W 72/12* (2009.01)

(52) U.S. Cl.
CPC .............. *H04W 16/04* (2013.01); *H04L 47/10* (2013.01); *H04L 47/14* (2013.01); *H04W 72/1205* (2013.01); *H04W 72/1252* (2013.01); *H04W 72/1257* (2013.01)

(58) Field of Classification Search
CPC ..................................................... H04L 47/15
See application file for complete search history.

(56) References Cited

U.S. PATENT DOCUMENTS

| 7,269,657 B1 * | 9/2007 | Alexander ............ H04L 47/115 370/230 |
| 2002/0053011 A1 * | 5/2002 | Aiken .................... G06F 9/5016 711/170 |
| 2002/0059403 A1 * | 5/2002 | Fukushige .......... H04L 41/0213 709/220 |

(Continued)

FOREIGN PATENT DOCUMENTS

WO  2014044301 A1  3/2014

OTHER PUBLICATIONS

Combined Search and Examination Report dated Jan. 24, 2017 for GB Application No. GB1622358.8.

*Primary Examiner* — Huy D Vu
*Assistant Examiner* — Kevin Cunningham
(74) *Attorney, Agent, or Firm* — EIP US LLP (57) ABSTRACT

A first finite resource allocation request is received at a finite resources allocation server from a first client network node requesting a first amount of a given type of finite resource for use by the first client network node. A first allocated amount of the given type of finite resource is first allocated to the first client network node. The first allocating allocates the first allocated amount at least on the basis of a previously allocated first amount. A second finite resource allocation request is received at the finite resources allocation server from a second client network node requesting a second amount of the given type of finite resource. A second allocated amount of the given type of finite resource is second allocated to the second client network node. The second allocating allocates the second allocated amount at least on the basis of a previously allocated second amount.

33 Claims, 2 Drawing Sheets

(56) References Cited

U.S. PATENT DOCUMENTS

| | | | |
|---|---|---|---|
| 2005/0180350 A1* | 8/2005 | Kolor | H04J 13/0048 370/320 |
| 2005/0213503 A1 | 9/2005 | Guo et al. | |
| 2008/0253285 A1* | 10/2008 | Lakkakorpi | H04L 69/28 370/230 |

* cited by examiner

RESOURCE ALLOCATION

CROSS-REFERENCE TO RELATED APPLICATIONS

This application claims priority under 35 U.S.C. § 119(a) to UK patent application no. GB1622358.8, filed on 29 Dec. 2016, the entire content of which is hereby incorporated by reference.

BACKGROUND OF THE INVENTION

Field of the Invention

The present disclosure relates to resource allocation. In particular, but not exclusively, the present disclosure relates to allocation of finite resources to network nodes in a network.

Description of the Related Technology

Known session border controllers (SBCs), such as Metaswitch™'s Perimeta™, have various user configurable limits in place regulating admission of new calls to a network or system. For example, "There may only be 10,000 calls up at one time on SBC A" or "A maximum of 500 calls per second can be accepted to destination X". The process of policing these limits is called call admission control (CAC). With just one session border controller, determining whether to accept or reject a call based on such limits is relatively straightforward.

With multiple SBCs, determining whether to accept or reject a call based on such limits is difficult as globally configured CAC limits are policed across a plurality of network nodes (for example across a cluster of network nodes). For example, "There may only be 10,000 calls up at one time summed across all SBCs in cluster A" or "A maximum of 500 calls per second can be accepted to destination X, regardless of which SBCs in cluster A they came through".

In a fixed deployment, the above scenario could be tackled by dividing the limit by the number of instances (for example if there are N SBCs, then each SBC could be apportioned 1/Nth of the available limit). This however falls short in a cloud environment, where there is an ever changing number of SBCs acting as a single entity (i.e. N both rapidly varies with time and at any given time is unknown to each SBC).

SUMMARY

According to some embodiments, there is a method of allocating finite resources to client network nodes in a network. The method includes, at a finite resources allocation server, receiving, from a first client network node, a first finite resource allocation request requesting a first amount of a given type of finite resource for use by the first client network node in the network. The method includes first allocating, to the first client network node, a first allocated amount of the given type of finite resource that the first client network node is allowed to use in the network. The first allocating allocates the first allocated amount at least on the basis of a previously allocated first amount of the given type of finite resource that the first client network node was previously allowed to use in the network. The first allocating allocates the first allocated amount at least on the basis of a previously requested first amount of the given type of finite resource that the first client network node previously requested to use in the network. The first allocating allocates the first allocated amount at least on the basis of the previously allocated first amount as a first previous proportion of the previously requested first amount. The method includes receiving, from a second client network node, a second finite resource allocation request requesting a second amount of the given type of finite resource for use by the second client network node in the network. The method includes second allocating, to the second client network node, a second allocated amount of the given type of finite resource that the second client network node is allowed to use in the network. The second allocating allocates the second allocated amount at least on the basis of a previously requested second amount of the given type of finite resource that the second client network node previously requested to use in the network. The second allocating allocates the second allocated amount at least on the basis of the previously allocated second amount as a second previous proportion of the previously requested second amount. The first allocating allocates the first allocated amount at least on the basis of the first previous proportion and the second previous proportion.

According to some other embodiments, a system for use in allocating finite resources to client network nodes in a network is provided. The system includes at least one memory including computer program code. The system includes at least one processor in data communication with the at least one memory. The at least one processor is configured to, at a finite resources allocation server, receive, from a first client network node, a first finite resource allocation request requesting a first amount of a given type of finite resource for use by the first client network node in the network. The at least one processor is configured to, at a finite resources allocation server, first allocate, to the first client network node, a first allocated amount of the given type of finite resource that the first client network node is allowed to use in the network. The first allocating allocates the first allocated amount at least on the basis of a previously allocated first amount of the given type of finite resource that the first client network node was previously allowed to use in the network. The first allocating allocates the first allocated amount at least on the basis of a previously requested first amount of the given type of finite resource that the first client network node previously requested to use in the network. The first allocating allocates the first allocated amount at least on the basis of the previously allocated first amount as a first previous proportion of the previously requested first amount. The at least one processor is configured to, at a finite resources allocation server, receive, from a second client network node, a second finite resource allocation request requesting a second amount of the given type of finite resource for use by the second client network node in the network. The at least one processor is configured to, at a finite resources allocation server, second allocate, to the second client network node, a second allocated amount of the given type of finite resource that the second client network node is allowed to use in the network. The second allocating allocates the second allocated amount at least on the basis of a previously requested second amount of the given type of finite resource that the second client network node previously requested to use in the network. The second allocating allocates the second allocated amount at least on the basis of the previously allocated second amount as a second previous proportion of the previously requested second amount. The first allocating allocates the first allocated amount at least on the basis of the first previous proportion and the second previous proportion.

In yet other embodiments, a non-transitory computer-readable storage medium comprising computer-executable instructions is provided. The computer-executable instructions, when executed by a processor, cause a computing device to perform a method of allocating finite resources to client network nodes in a network. The method includes, at a finite resources allocation server, receiving, from a first client network node, a first finite resource allocation request requesting a first amount of a given type of finite resource for use by the first client network node in the network. The method includes, at a finite resources allocation server, first allocating, to the first client network node, a first allocated amount of the given type of finite resource that the first client network node is allowed to use in the network. The first allocating allocates the first allocated amount at least on the basis of a previously allocated first amount of the given type of finite resource that the first client network node was previously allowed to use in the network. The first allocating allocates the first allocated amount at least on the basis of a previously requested first amount of the given type of finite resource that the first client network node previously requested to use in the network. The first allocating allocates the first allocated amount at least on the basis of the previously allocated first amount as a first previous proportion of the previously requested first amount. The method includes, at a finite resources allocation server, receiving, from a second client network node, a second finite resource allocation request requesting a second amount of the given type of finite resource for use by the second client network node in the network. The method includes, at a finite resources allocation server, second allocating, to the second client network node, a second allocated amount of the given type of finite resource that the second client network node is allowed to use in the network. The second allocating allocates the second allocated amount at least on the basis of a previously requested second amount of the given type of finite resource that the second client network node previously requested to use in the network. The second allocating allocates the second allocated amount at least on the basis of the previously allocated second amount as a second previous proportion of the previously requested second amount. The first allocating allocates the first allocated amount at least on the basis of the first previous proportion and the second previous proportion.

Further features of the present disclosure will become apparent from the following description of preferred embodiments, given by way of example only, which is made with reference to the accompanying drawings.

DETAILED DESCRIPTION OF CERTAIN INVENTIVE EMBODIMENTS

Figure 1:
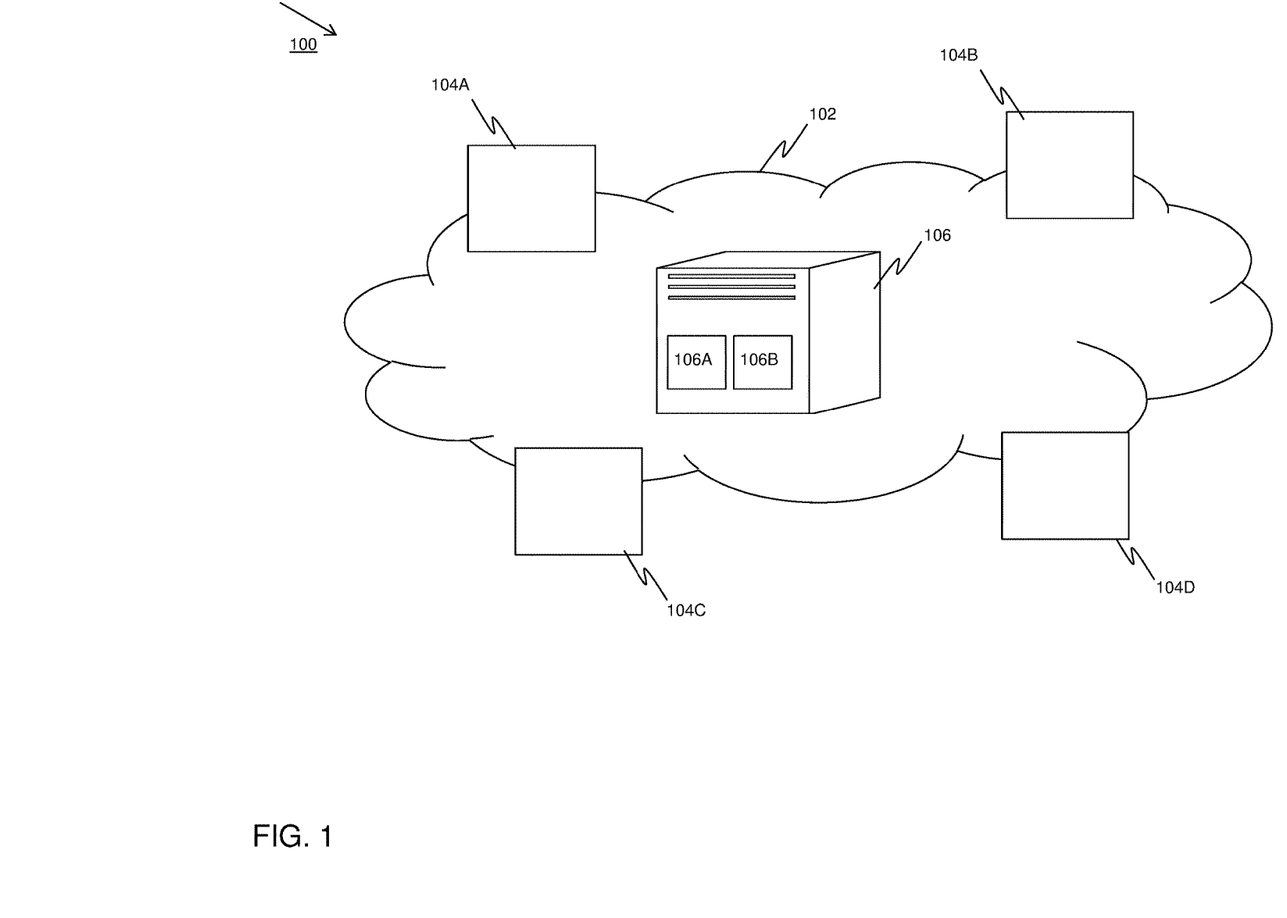
FIG. 1 shows a system diagram according to embodiments.

FIG. 1 shows a system diagram of a system 100 according to embodiments. System 100 comprises a finite resources allocation server 106 and a plurality of network nodes 104A, 104B, 104C, 104D.

Finite resources allocation server 106 is depicted in FIG. 1 as being located in a network 102, but in other embodiments may be located on the border of network 102 or outside of network 102. One or more of finite resources allocation server 106 and network nodes 104A, 104B, 104C, 104D may be located in a different network or part of the network (not shown).

In embodiments, finite resources allocation server 106 comprises one or more processors 106A for performing various data processing operations according to embodiments. Finite resources allocation server 106 may comprise or more memories 106B which may be integral to or external to finite resources allocation server 106. Memory 106B may comprise memory within finite resources allocation server 106 which is available for storing state data for communication sessions processed by finite resources allocation server 106; some or all of the memory may be volatile so that some or all of the data stored therein is lost upon failure/re-boot of finite resources allocation server 106.

Network 102 may comprise one or more wireless, wired, packet-switched and/or a circuit-switched networks, for example an Internet Protocol (IP) network such as the internet, an IP Multimedia Subsystem (IMS) network, a 3GPP network, etc. Network nodes 104A, 104B, 104C, 104D are depicted in FIG. 1 as being located at a border (or 'edge') of network 102.

In embodiments, one or more of network nodes 104A, 104B, 104C, 104D act as clients to finite resources allocation server 106. In embodiments, one or more of network nodes 104A, 104B, 104C, 104D act as clients to finite resources allocation server 106 in respect of the allocation of finite resources of a given type within network 102.

Network nodes 104A, 104B, 104C, 104D may comprise one or more of SBCs, media gateways, softswitches, proxy call session control functions (P-CSCFs from an IMS network), and servers. Finite resources allocation server 106 is able to communicate with other network elements in network 102 such as network nodes 104A, 104B, 104C, 104D via one or more wired or wireless network connections (not shown). Finite resources allocation server 106 may for example be logically located on the border between two networks (not shown).

Network 102 may comprise a number of user devices (or 'endpoints') (not shown) such as mobile (or 'cellular') telephones, SIP telephones, tablets, personal computers, etc. to which communication services may be provided by network nodes 104A, 104B, 104C, 104D.

Embodiments relate to a new network element or network elements (referred to herein as finite resources allocation server 106) to mediate the capacity of any limit across a cluster of other network elements (referred to herein as network nodes 104A, 104B, 104C, 104D) which act as clients to finite resources allocation server 106, along with a protocol used to communicate between finite resources allocation server 106 and client network nodes 104A, 104B, 104C, 104D.

In embodiments, finite resources allocation server 106 is dumb and soft-state only. In embodiments, finite resources allocation server 106 has no configuration and does not know anything about the finite resource(s) which are to be allocated to network nodes 104A, 104B, 104C, 104D.

Finite resources allocation server 106 is configured to allocate (or 'distribute' or 'share out') amounts of finite resources between those client network nodes that contact it. Finite resources allocation server 106 learns in real-time, from client network nodes 104A, 104B, 104C, 104D, about the 'type' (or 'types') of finite resources to share out and the amount there is to share in each type. In embodiments, the 'types' are arbitrary strings, used as correlators and without any particular meaning to finite resources allocation server 106.

According to embodiments, each client network device requests a 'grant' on each limit it knows about from finite resources allocation server 106 and is returned how much that client network device is allowed to use. For example, in the following protocol exchange, a client network device 104A requests an allocation of 100 units (from a total limit of 1000 units) of an example limit type of 'total_calls', and the response from finite resources allocation server 106 is that client network device 104A can only have 90 units. The notation here is that 'NEED' denotes a finite resource allocation request by a client network node to the finite resource allocation server and 'GRANT' denotes an allocation of the finite resource to the requesting client network node by the finite resource allocation server.

Client network node 104A->Finite resource allocation server 106: "NEED type=total_calls, need=100, capacity=1000".

Finite resource allocation server 106->Client network node 104A: "GRANT type=total_calls, grant=90".

In embodiments, upon receipt of the first NEED request of a given type, finite resources allocation server 106 creates a pool for that type with the given capacity, and returns a GRANT response to the client network node that made the request with a grant from that pool. Subsequent NEED requests with the same type use the existing pool with the response sent to just the client that sent the NEED request. In embodiments, the protocol employs a single request with single response, rather than multiple unsolicited responses sent to multiple/all clients.

On receipt of a GRANT response, each client network node uses the grant it received as its own individual limit. Clients network nodes refresh their allocation (for example periodically) by each sending a new NEED request to finite resources allocation server 106, and update their own individual limits according to the respective response grant from finite resources allocation server 106.

In some embodiments, in the event that finite resources allocation server 106 fails, a new server is started (or 'instantiated') and immediately continues processing requests from the client network nodes (the clients only need to know the new server location/address which can be provided as global configuration shared across the client network nodes). At the start of day, the new finite resources allocation server starts off believing that there is nothing to be shared out, and handles incoming requests no differently to the steady state.

Embodiments provide measures, including methods, apparatus, computer programs and computer program products, for use in allocating finite resources to client network nodes (for example one or more of network nodes 104A, 104B, 104C, 104D) in a network (such as network 102). In embodiments, allocation of finite resources is carried out by finite resources allocation server 106.

Figure 2:
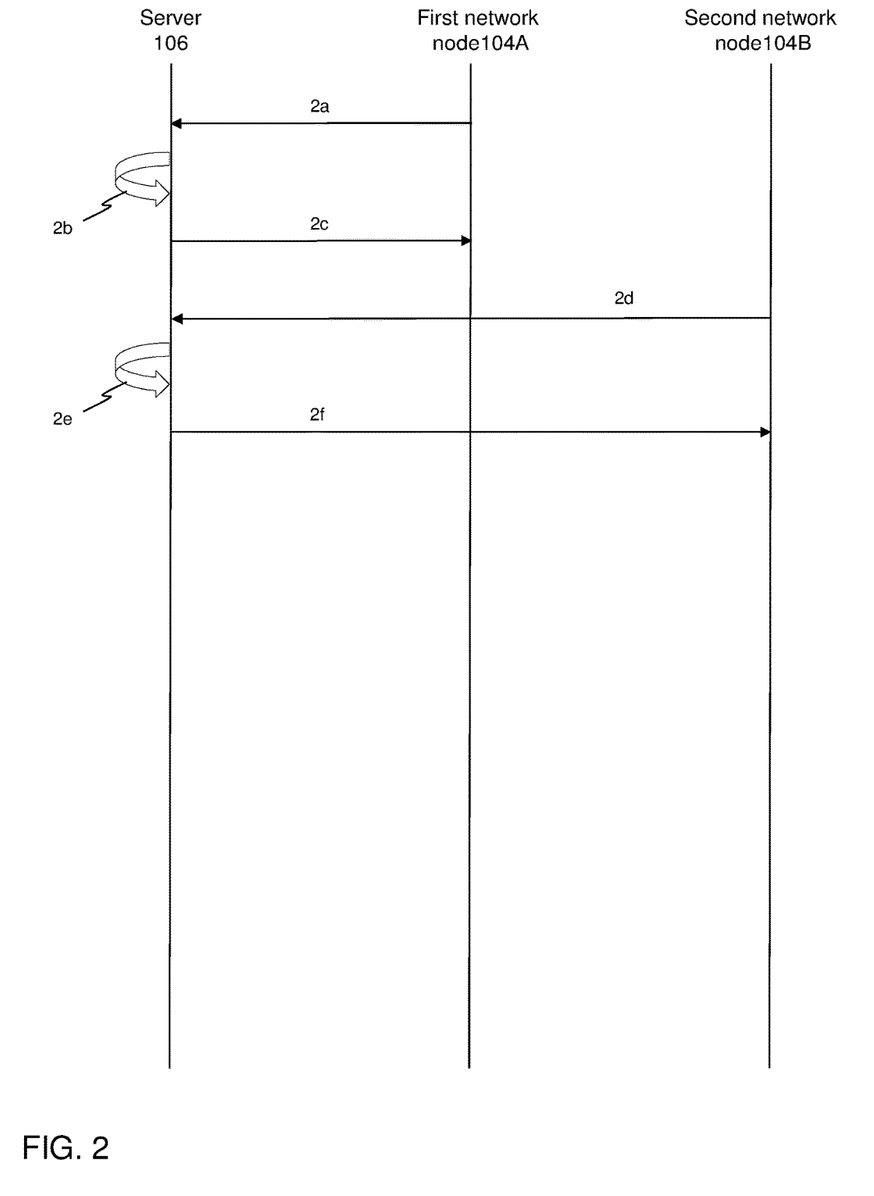
FIG. 2 shows a message flow diagram according to embodiments.

Embodiments of the present disclosure are now described in relation to FIG. 2. FIG. 2 shows a message flow diagram depicting message flow between finite resources allocation server 106, first client network node 104A and second client network node 104B.

In item 2a, first client network node 104A transmits a first finite resource allocation request requesting a first amount of a given type of finite resource for use by first client network node 104A in network 102 to finite resources allocation server 106.

Upon receipt of the first finite resource allocation request of item 2a requesting a first amount of a given type of finite resource for use by first client network node 104A in network 102, finite resources allocation server 106 first allocates, to first client network node 104A, a first allocated amount of the given type of finite resource that first client network node 104A is allowed to use in network 102 as per item 2b. The first allocating allocates the first allocated amount at least on the basis of a previously allocated first amount of the given type of finite resource that first client network node 104A was previously allowed to use in network 102. An indication of the first allocated amount of the given type of finite resource that first client network node 104A is allowed to use in network 102 is provided to first client network node 104A in item 2c (for example in the form of a first finite resource allocation response message).

In item 2d, second client network node 104B transmits a second finite resource allocation request requesting a second amount of the given type of finite resource for use by second client network node 104B in network 102 to finite resources allocation server 106.

Upon receipt of the second finite resource allocation request of item 2d requesting a second amount of the given type of finite resource for use by second client network node 104B in network 102, finite resources allocation server 106 second allocates, to second client network node 104B, a second allocated amount of the given type of finite resource that second client network node 104B is allowed to use in network 102 as per item 2e.

An indication of the second allocated amount of the given type of finite resource that second client network node 104B is allowed to use in network 102 is provided to second client network node 104B in item 2f (for example in the form of a second finite resource allocation response message).

In embodiments, the first allocating allocates the first allocated amount at least on the basis of a previously requested first amount of the given type of finite resource that the first client network node previously requested to use in the network. In some such embodiments, the first allocating allocates the first allocated amount at least on the basis of the previously allocated first amount as a first previous proportion of the previously requested first amount.

In embodiments, the first allocating allocates the first allocated amount at least on the basis of the requested first amount.

In embodiments, the second allocating allocates the second allocated amount at least on the basis of a previously allocated second amount of the given type of finite resource that the second client network node was previously allowed to use in the network. In some such embodiments, the second allocating allocates the second allocated amount at least on the basis of a previously requested second amount of the given type of finite resource that the second client network node previously requested to use in the network.

In embodiments, the second allocating allocates the second allocated amount at least on the basis of the previously allocated second amount as a second previous proportion of the previously requested second amount. In embodiments, the second allocating allocates the second allocated amount at least on the basis of the requested second amount.

In embodiments, the first allocating allocates the first allocated amount at least on the basis of the first previous proportion and the second previous proportion. In embodiments, the first allocating allocates the first allocated amount at least on the basis of the first previous proportion compared to the second previous proportion. The first allocating may for example allocate the first allocated amount so as to first adjust the first allocated amount as a proportion of the first requested amount towards the second previous proportion. The second allocating may for example allocate the second allocated amount at least on the basis of the first previous proportion and the second previous proportion.

In embodiments, the second allocating allocates the second allocated amount at least on the basis of the first previous proportion compared to the second previous proportion. In embodiments, the second allocating allocates the second allocated amount so as to second adjust the second allocated amount as a proportion of the second requested amount towards the first allocated amount as a proportion of the first requested amount.

In embodiments, the first allocating to the first client network node comprises sending an amount allocation message to the first client network node and no other client network nodes in the network. In embodiments, the second allocating to the second client network node comprises sending an amount allocation message to the second client network node and no other client network nodes in the network. Allocation according to embodiments therefore involves a low level of protocol traffic in the network.

In embodiments, one or more of the first finite resource allocation request of item 2a and the second finite resource allocation request of item 2d comprise an indication of the given type of finite resource to which the respective finite resource allocation request relates. In embodiments, one or more of the first finite resource allocation request of item 2a and the second finite resource allocation request of item 2d comprise an indication of a maximum total capacity of the given type of finite resource which can be allocated in the network.

Embodiments relate to measures for fairly determining the number of units to allocate to client network nodes from a pool of a given finite resource. Such embodiments can be applied in scenarios where the sum of resources requested in finite resource allocation requests exceeds the available maximum capacity, and a first-come-first-served approach to allocating the finite resources would mean that those client network nodes that makes their requests earlier get all or the majority of the available resource, and those client network nodes requesting later get none or very little.

In some usage scenarios, such an 'unfair' allocation of resources may be unacceptable. For example, consider a cluster of SBCs owned by service provider XX protecting the entry point to their IMS core by policing a total call limit. XX's cluster consists of two SBCs: SBC A taking calls from peer service provider AA, and SBC B taking calls from peer service provider BB. From a steady state where there is plenty of capacity available for both AA and BB, if both suddenly experience a high call load (for example in a mass voting event for a television program when voting suddenly opens), a first-come-first-served approach would see all the available limit allocated to the first SBC to send its finite resource allocation request, leaving no grant available for the second SBC when it sends its finite resource allocation request, effectively blocking all calls from one service provider (where one may for example be selected at random based on the order of messages received).

In the following example protocol flow, 'NEED' denotes a finite resource allocation request and 'GRANT' denotes an allocation of the finite resource as in the earlier example above.

The following example begins in a steady state where need is below capacity and fully granted to all client network nodes.

A client network node 104A requests an allocation of 1 unit of a finite resource of type total_calls where the maximum capacity in the network for this type of finite resource is 100:

Client network node 104A->Finite resource allocation server 106: "NEED type=total_calls, need=1, capacity=100".

Finite resource allocation server 106 allocates 1 unit of the finite resource of type total calls to client network node 104A:

Finite resource allocation server 106->Client network node 104A: "GRANT type=total_calls, grant 1".

A client network node 104B then requests an allocation of 1 unit of the finite resource of type total_calls where the maximum capacity in the network for this type of finite resource is 100:

Client network node 104B->Finite resource allocation server 106: "NEED type=total_calls, need=1, capacity=100".

Finite resource allocation server 106 allocates 1 unit of the finite resource of type total calls to client network node 104B:

Finite resource allocation server 106->Client network node 104B: "GRANT type=total_calls, grant 1".

And so on.

A flood event (such as a mass voting event) begins and client network node 104A happens to refresh first and sends a finite resource allocation request to finite resource allocation server 106.

At this time, 99 units are available to client network node 104A, with 1 already allocated to client network node 104B.

Client network node 104A requests an allocation of 1000 units of the finite resource of type total_calls where the maximum capacity in the network for this type of finite resource is 100:

Client network node 104A->Finite resource allocation server 106: "NEED type=total_calls, need=1000, capacity=100".

Finite resource allocation server 106 allocates 99 units of the finite resource of type total calls to client network node 104A:

Finite resource allocation server 106->Client network node 104A: "GRANT type=total_calls, grant 99".

Shortly after, client network node 104B now refreshes and requests an allocation of 1000 units of the finite resource of type total_calls where the maximum capacity in the network for this type of finite resource is 100:

Client network node 104B->Finite resource allocation server 106: "NEED type=total_calls, need=1000, capacity=100".

However, 99 of the total of 100 units have been allocated to client network node 104A, so only 1 unit is available for allocation to client network node 104B:

Finite resource allocation server 106->Client network node 104B: "GRANT type=total_calls, grant 1".

The above example embodiment can be seen as an unfair situation because client network node 104A is allocated a much higher proportion of the finite resource than is allocated to client network node 104B.

Embodiments employ novel damped averaging techniques which ensure that resources are allocated in proportion to need. A characteristic of such embodiments is that each request/response moves towards a 'fairer' distribution by load-balancing based on the most recently received requests from the client network nodes.

The following example begins in a steady state where need is below capacity and fully granted to all client network nodes.

A client network node 104A requests an allocation of 1 unit of a finite resource of type total_calls where the maximum capacity in the network for this type of finite resource is 100:

Client network node 104A->Finite resource allocation server 106: "NEED type=total_calls, need=1, capacity=100".

Finite resource allocation server 106 allocates 1 unit of the finite resource of type total calls to client network node 104A:

Finite resource allocation server 106 ->Client network node 104A: "GRANT type =total_calls, grant 1".

A client network node 104B then requests an allocation of 1 unit of the finite resource of type total_calls where the maximum capacity in the network for this type of finite resource is 100:

Client network node 104B->Finite resource allocation server 106: "NEED type=total_calls, need=1, capacity=100".

Finite resource allocation server 106 allocates 1 unit of the finite resource of type total calls to client network node 104B:

Finite resource allocation server 106->Client network node 104B: "GRANT type=total_calls, grant 1".

And so on.

A flood event (such as a mass voting event) begins and client network node 104A happens to refresh first and sends a finite resource allocation request to finite resource allocation server 106.

At this time, 99 units are available to client network node 104A, with 1 already allocated to client network node 104B.

Client network node 104A requests an allocation of 1000 units of the finite resource of type total_calls where the maximum capacity in the network for this type of finite resource is 100:

Client network node 104A->Finite resource allocation server 106: "NEED type=total_calls, need=1000, capacity=100".

Finite resource allocation server 106 allocates 99 units of the finite resource of type total calls to client network node 104A:

Finite resource allocation server 106->Client network node 104A: "GRANT type=total_calls, grant 99".

According to these embodiments, finite resource allocation server 106 now stores data indicating that client network node 104A has been granted 10% (approximately, as 99/1000≈10%) of what it requested.

Client network node 104B now refreshes and requests an allocation of 1000 unit of the finite resource of type total_calls where the maximum capacity in the network for this type of finite resource is 100:

Client network node 104B->Finite resource allocation server 106: "NEED type=total_calls, need=1000, capacity=100".

However, only 1 unit is available, as 99 have already been allocated to A, so finite resource allocation server 106 is only able to allocate 1 unit of the finite resource of type total_calls to client network node 104B:

Finite resource allocation server 106->Client network node 104B: "GRANT type=total_calls, grant 1".

According to these embodiments, finite resource allocation server 106 now stores data indicating that client network node 104B has been granted 0.1% (as 1/1000=0.1%) of what it requested.

A number of seconds pass until client network node 104A and client network node 104B refresh.

Finite resource allocation server 106 is aware that it allocated an unfair 10%/0.1% split of the finite resource of type total_calls to client network node 104A and client network node 104B respectively.

The flood event continues and finite resource allocation server 106 proceeds to adjust the allocations to network node 104A and client network node 104B to make the allocation fairer than currently according to embodiments.

Client network node 104A refreshes and requests an allocation of 1000 units of the finite resource of type total_calls where the maximum capacity in the network for this type of finite resource is 100:

Client network node 104A->finite resource allocation server 106: "NEED type=total_calls, need=1000, capacity=100".

Finite resource allocation server 106 allocates a lower proportion to client network node 104A than what it was allocated previously:

Finite resource allocation server 106->Client network node 104A: "GRANT type=total_calls, grant 90".

According to these embodiments, finite resource allocation server 106 now stores data indicating that client network node 104A has been granted 9% (as 90/1000=9%) of what it requested.

Client network node 104B refreshes and requests an allocation of 1000 units of the finite resource of type total_calls where the maximum capacity in the network for this type of finite resource is 100:

Client network node 104B->Finite resource allocation server 106: "NEED type=total_calls, need=1000, capacity=100".

10 units are available, as 90 have already been allocated to client network node 104A, so finite resource allocation server 106 allocates these 10 units to client network node 104B:

Finite resource allocation server 106->Client network node 104B: "GRANT type=total_calls, grant 10".

According to these embodiments, finite resource allocation server 106 now stores data indicating that client network node 104B has been granted 1% (as 10/1000=10%) of what it requested.

As can be seen, the proportion of finite resource allocated to client network node 104A to what it requested has changed from 10% to 9% and the proportion of finite resource allocated to client network node 104B to what it requested has changed from 0.1% to 1%.

Further iterations of the above can be performed to successively adjust these proportions until they approximately match each other.

In embodiments, in response to receipt of subsequent finite resource allocation requests for the given type of finite resource from first and second client network nodes 104A, 104B, finite resource allocation server 106 performs successive iterations of the first allocating and the second allocating until an amount of the given type of finite resource allocated to first client network node 104A as a proportion of an amount of the given type of finite resource requested by first client network node 104A equals an amount of the given type of finite resource allocated to second client network node 104B as a proportion of an amount of the given type of finite resource requested by second client network node 104B. In embodiments, subsequent finite resource allocation requests are received in response to finite resource allocation refresh operations being carried out at the respective client network nodes. The finite resource allocation refresh operations may be carried out periodically.

In the above example, approximately five iterations (each iteration including an allocation to each of client network node 104A and client network 104B) are performed until 50 units of the finite resource are allocated to each of client network node 104A and client network 104B, i.e. a proportion of 5% allocated to what is requested for each. This 5% allocation can be referred to as a proportionate balance and in this example is achieved approximately 5×N seconds after the flood begins.

Note that in the above example, the adjustment between the proportions allocated to what is requested was approximately a 1% change in proportion for each client network device for each refresh iteration, i.e. 10% to 9% to 8% to 7% to 6% to 5% is five iterations for client network node 104A and 0.1% to 1% to 2% to 3% to 4% to 5% is five iterations for client network node 104B.

This percentage adjustment each N second window can be considered as a configurable 'damping factor' which can be tuned by a service provider or service operator responsible for finite resource allocation server 106. The configurable damping factor can be tuned appropriately to balance achieving fairness quickly, and sticking closely to the overall network capacity limit.

In embodiments, one or more of the first allocating and the second allocating is carried out at least in part on the basis of a configurable damping factor. In embodiments, a rate of one or more of the first adjusting and the second adjusting is carried out at least in part on the basis of the configurable damping factor. In embodiments, a relatively high damping factor leads to the rate of one or more of the first adjusting and the second adjusting being relatively faster whereas a relatively low damping factor leads to the rate of one or more of the first adjusting and the second adjusting being relatively slower. Selection of an appropriate damping factor will depend upon a range of factors including the type of finite resource, number of client network nodes, refresh rates of the client network nodes, etc. A relatively high damping factor may for example comprise a value between 5% and 10% per iteration, but could also be over 10%. A relatively low damping factor may for example comprise a value between 5% and 0.1% per iteration, but could also be under 0.1%.

According to some embodiments, when the grant allocation decreases, client network nodes are not required to immediately release any currently used capacity above the limit. For example, if a client network node is given a grant to accept 10 calls, it accepts 10 calls, then after refreshing is subsequently given a grant to accept 8 calls, it doesn't have to release the excess 2 calls, and these can terminate normally sometime later; no new calls may however be accepted until the total falls to below 8). Some embodiments therefore operate soft-limits on resource allocation limits; for example, summed across a cluster of client network nodes, a total limit granted may temporarily exceed the configured limit while client network nodes wait for the resource used to fall below their allocation.

In embodiments, one or more of the first requested amount and the second requested amount comprise an amount of the given type of finite resource which is greater than a maximum total capacity of the given type of finite resource which can be allocated in the network.

In embodiments, state data retained by finite resource allocation server 106 only covers the last N seconds (not any further back), and is learned 'on-the-fly'. Embodiments therefore avoid having any state data to replicate on failover.

In embodiments, finite resources allocation server 106 is responsible for allocating the given type of finite resource to a plurality of client network nodes in the network.

In embodiments, finite resources allocation server 106 is responsible for allocating a plurality of types of finite resource to client network nodes in the network. So for example, finite resources allocation server 106 may allocate a first finite resource of type totals calls to client network nodes in the network as well as a second finite resource of type data storage to client network nodes in the network. Some or all of the client network nodes to which the first finite resource is allocated by finite resources allocation server 106 may be in common with client network nodes to which the second finite resource is allocated by finite resources allocation server 106. The client network nodes to which the first finite resource is allocated by finite resources allocation server 106 may all be different client network nodes to which the second finite resource is allocated by finite resources allocation server 106.

In embodiments, finite resources allocation server 106 is responsible for allocating one or more finite resources in relation to CAC.

The given type of finite resource may for example be associated with one or more of a total number of calls in the network, a call rate, data storage, and processing resources.

In some embodiments, the first and second client network nodes 104A, 104B are comprised in a cluster of network nodes responsible for providing one or more communication functions in the network. In some embodiments, the first and second client network nodes 104A, 104B are comprised in a cluster of network nodes responsible for providing one or more telephony functions in the network. The cluster of nodes may be hosted in/across one or more data centers.

In other embodiments, the first and second client network nodes 104A, 104B may not comprise a cluster. In some embodiments first client network node 104A is operated by a different network operator or service provider to that responsible for operating client network node 104B.

The first and second client network nodes may for example comprise one or more of SBCs, media gateways, softswitches, proxy call session control functions (P-CSCFs), and servers. The first and second client network nodes need not necessarily perform the same or similar functions in the network. The first and second client network nodes may for example comprise a mixture of different types of network node, each performing one or more different roles in the network.

In embodiments, finite resources allocation server 106 is co-located with one or more of the first client network node 104A, the second client network node 104B and another node in the network. Such embodiments mean that a new physical network element is not required in order to implement embodiments. According to such embodiments, in a failure scenario (for example, a network partition), there will generally be at least one finite resources allocation server available for each client network node (i.e. the local one).

In embodiments, one or more functions of finite resources allocation server 106 are co-located with one or more of the client network nodes.

In embodiments, the first allocating and the second allocating occur after start-up of finite resources allocation server 106. In embodiments, the first allocating and the second allocating occur after re-starting of finite resources allocation server 106 following failure.

In embodiments, the previously allocated first amount of the given type of finite resource that the first client network node was previously allowed to use in the network is assumed to be zero. In embodiments the previously allocated first amount of the given type of finite resource that the first client network node was previously allowed to use in the network is assumed to be a default amount. In embodiments, the previously allocated first amount of the given type of finite resource that the first client network node was previously allowed to use in the network is indicated in the received first finite resource allocation request. Such embodiments reduce the need for state data storage.

In deployments with very high numbers of clients (which is possible in a cloud-based micro-services scenario) and performance of the server may be an issue, the server function can be split over multiple servers with each server servicing a subset of the types according to embodiments. For example, all requests for a given type can go to the same server, but different types go to different servers. In embodiments, the mapping of type to server can be carried out via client-side global configuration (for example, specifically named servers for specific limits), allowing the workload to be spread around the cluster.

Embodiments described herein are able to handle any CAC limits. Embodiments can be employed in relation to any distributed allocation problem where resources are required to be apportioned across a cluster.

Embodiments are stateless. Finite resources allocation server 106 requires no configuration and can fail with no additional processing required by either the client network nodes or server to handle this. Embodiments do not require each network element to store state that is to be kept in sync with the state stored on other network elements.

Embodiments provide fair allocation of finite resources across multiple client network nodes. Embodiments ameliorate situations where one or more network elements take an unfair share of limited resources. Embodiments avoid situations where a network element requests reservation of all the available capacity, subsequent requests by other network elements fail (as there would be no capacity left for the central server to allocate), one network element is left handling all the load, and all the others are idle. Embodiments act to provide load-balancing across a number of network elements.

Instead of a central finite resources allocation server, an alternative implementation could use a token-ring approach to pass details of the allocations around the client network nodes with no need for a new server network element.

Embodiments provide measures, including methods, apparatus, computer programs and computer program products, for use in allocating finite resources to network nodes in a network.

In currently unclaimed examples, a system is configured to operate a token-ring system between a plurality of network nodes in the network.

The system is configured to, at a first network node in the plurality, receive a token indicating amounts of a given type of finite resource previously allocated for use in the network by network nodes in the plurality. The received token comprises an indication of a previously first allocated amount of the given type of finite resource that the first network node was previously allowed to use in the network.

The system is further configured to, at the first network node in the plurality, first allocate, to the first network node, a first allocated amount of the given type of finite resource that the first network node is allowed to use in the network. The first allocating allocates the first allocated amount at least on the basis of the previously first allocated amount indicated in the received token.

The system is further configured to, at the first network node in the plurality, generate an updated token by inserting the first allocated amount into the received token, and transmit the updated token to a second network node in the plurality.

In currently unclaimed examples, the system is configured to, at the second network node in the plurality, receive the updated token transmitted from the first network node, and second allocate, to the second network node, a second allocated amount of the given type of finite resource that the second network node is allowed to use in the network. The second allocating allocates the second allocated amount at least on the basis of the first allocated amount indicated in the received updated token.

In currently unclaimed examples, the system is configured to, at the second network node in the plurality, generate a further updated token by inserting the second allocated amount into the received updated token, and transmit the further updated token to a further network node in the plurality.

In currently unclaimed examples, the received updated token comprises an indication of a second previously allocated amount of the given type of finite resource that the second network node was previously allowed to use in the network. In some currently unclaimed examples, the second allocating allocates the second allocated amount at least on the basis of the second previously allocated amount indicated in the received updated token.

In some token-ring currently unclaimed examples, each node waits for the token to complete a full loop around other nodes before adjusting its own allocations. In some token-ring currently unclaimed examples, each node does not attempt to adjust its allocation immediately in response to changing needs, but instead waits until the token arrives before attempting to change.

Token-ring currently unclaimed examples may employ one or more features from any of the finite resource allocation server embodiments described herein.

In embodiments, finite resources allocation server 106 comprises a processor or processing system, as depicted by element 106A in FIG. 1. In embodiments, the processing system comprises one or more processors and/or memory 106B. Each device as described in relation to any of the embodiments described above may similarly comprise a processor and/or processing system. One or more of the aspects of the embodiments described herein with reference to the drawings comprise processes performed by finite resources allocation server 106. In embodiments, finite resources allocation server 106 comprises one or more processing systems or processors configured to carry out these processes. In this regard, embodiments may be implemented at least in part by computer software stored in (non-transitory) memory and executable by the processor, or by hardware, or by a combination of tangibly stored software and hardware (and tangibly stored firmware). Embodiments also extend to computer programs, particularly computer programs on or in a carrier, adapted for putting the above described embodiments into practice. The program may be in the form of non-transitory source code, object code, or in any other non-transitory form suitable for use in the implementation of processes according to embodiments. The carrier may be any entity or device capable of carrying the program, such as a RAM, a ROM, or an optical memory device; etc.

The above embodiments are to be understood as illustrative examples of the present disclosure. Further embodiments of the present disclosure are envisaged.

Several embodiments have been described in relation to allocation of resources to two client network nodes. Embodiments can equally apply to different numbers of client network nodes.

Several embodiments have been described in relation to allocation of resources relating to a total number of calls. Embodiments can equally apply to call rate, data storage, processing resources and any other type of resource.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the embodiments, which is defined in the accompanying claims.

What is claimed is:

1. A method of allocating finite resources to client network nodes in a network, the method comprising, at a finite resources allocation server:
    determining a previously requested first amount of a given type of finite resource that a first client network node previously requested to use in the network;
    determining a previously allocated amount of the given type of finite resource that was previously allocated, in response to the previous request, to the first client network node;
    dividing the determined previously allocated amount by the determined previously requested first amount to obtain an indication of a first previous proportion of the previously requested first amount that was previously allocated to the first client network node;
    receiving, from the first client network node, a first finite resource allocation request requesting a first amount of the given type of finite resource for use by the first client network node in the network;
    first allocating, to the first client network node, a first allocated amount of the given type of finite resource that the first client network node is allowed to use in the network,
    wherein the first allocating allocates the first allocated amount based at least in part on:
        the previously requested first amount of the given type of finite resource that the first client network node previously requested to use in the network,
        the indication of the first previous proportion, and
        an indication of a second previous proportion of a previously requested second amount of the given type of finite resource that a second client network node previously requested to use in the network that was previously allocated to the second client network node for use in the network;
    receiving, from the second client network node, a second finite resource allocation request requesting a second amount of the given type of finite resource for use by the second client network node in the network; and
    second allocating, to the second client network node, a second allocated amount of the given type of finite resource that the second client network node is allowed to use in the network,
    wherein the second allocating allocates the second allocated amount based at least in part on:
        the previously requested second amount of the given type of finite resource that the second client network node previously requested to use in the network, and
        the indication of the second previous proportion of the previously requested second amount of the given type of finite resource that the second client network node previously requested to use in the network that was previously allocated to the second client network node for use in the network; and
    wherein the first allocating allocates the first allocated amount at least on the basis of the first previous proportion compared to the second previous proportion.

2. The method of claim 1, wherein the first allocating allocates the first allocated amount at least on the basis of the requested first amount.

3. The method of claim 1, wherein the second allocating allocates the second allocated amount at least on the basis of a previously allocated second amount of the given type of finite resource that the second client network node was previously allowed to use in the network.

4. The method of claim 1, wherein the second allocating allocates the second allocated amount at least on the basis of the requested second amount.

5. The method of claim 1, wherein the first allocating allocates the first allocated amount so as to first adjust the first allocated amount as a proportion of the first requested amount towards the second previous proportion.

6. The method of claim 1, wherein the second allocating allocates the second allocated amount at least on the basis of the first previous proportion and the second previous proportion.

7. The method of claim 6, wherein the second allocating allocates the second allocated amount at least on the basis of the first previous proportion compared to the second previous proportion.

8. The method of claim 6, wherein the second allocating allocates the second allocated amount so as to second adjust the second allocated amount as a proportion of the second requested amount towards the first allocated amount as a proportion of the first requested amount.

9. The method of claim 1, comprising, in response to receipt of subsequent finite resource allocation requests for the given type of finite resource from the first and second client network nodes, performing successive iterations of the first allocating and the second allocating until an amount of the given type of finite resource allocated to the first client network node as a proportion of an amount of the given type of finite resource requested by the first client network node equals an amount of the given type of finite resource allocated to the second client network node as a proportion of an amount of the given type of finite resource requested by the second client network node.

10. The method of claim 9, wherein the subsequent finite resource allocation requests are received in response to finite resource allocation refresh operations being carried out at the respective client network nodes.

11. The method of claim 10, wherein the finite resource allocation refresh operations are carried out periodically.

12. The method of claim 1, wherein one or more of the first allocating and the second allocating is carried out at least in part on the basis of a configurable damping factor.

13. The method of claim 12, wherein the first allocating allocates the first allocated amount so as to first adjust the first allocated amount as a proportion of the first requested amount towards the second previous proportion,
    wherein the second allocating allocates the second allocated amount so as to second adjust the second allocated amount as a proportion of the second requested amount towards the first allocated amount as a proportion of the first requested amount, and
wherein a rate of one or more of the first adjusting and the second adjusting is carried out at least in part on the basis of the configurable damping factor.

14. The method of claim 13, wherein a relatively high damping factor leads to the rate of one or more of the first adjusting and the second adjusting being relatively faster whereas a relatively low damping factor leads to the rate of one or more of the first adjusting and the second adjusting being relatively slower.

15. The method of claim 1, wherein the first allocating to the first client network node comprises sending an amount allocation message to the first client network node and no other client network nodes in the network.

16. The method of claim 1, wherein the second allocating to the second client network node comprises sending an amount allocation message to the second client network node and no other client network nodes in the network.

17. The method of claim 1, wherein one or more of the first finite resource allocation request and the second finite resource allocation request comprise an indication of the given type of finite resource to which the respective finite resource allocation request relates.

18. The method of claim 1, wherein one or more of the first finite resource allocation request and the second finite resource allocation request comprise an indication of a maximum total capacity of the given type of finite resource which can be allocated in the network.

19. The method of claim 1, wherein one or more of the first requested amount and the second requested amount comprise an amount of the given type of finite resource which is greater than a maximum total capacity of the given type of finite resource which can be allocated in the network.

20. The method of claim 1, wherein the server is responsible for allocating the given type of finite resource to a plurality of client network nodes in the network.

21. The method of claim 1, wherein the server is responsible for allocating a plurality of types of finite resource to client network nodes in the network.

22. The method of claim 1, wherein the given type of finite resource is associated with one or more of:
a total number of calls in the network,
a call rate,
data storage, and
processing resources.

23. The method of claim 1, wherein the first and second client network nodes are comprised in a cluster of client network nodes responsible for providing one or more communication functions in the network.

24. The method of claim 1, wherein the first and second client network nodes are comprised in a cluster of network nodes responsible for providing one or more telephony functions in the network.

25. The method of claim 1, wherein the first and second client network nodes comprise one or more of:
session border controllers,
media gateways,
softswitches,
proxy call session control functions (P-CSCFs), and
servers.

26. The method of claim 1, wherein the server is co-located with one or more of the first client network node, the second client network node and another node in the network.

27. The method of claim 1, wherein the first allocating and the second allocating occur after start-up of the server.

28. The method of claim 1, wherein the first allocating and the second allocating occur after re-starting of the server following failure.

29. The method of claim 1, wherein the previously allocated first amount of the given type of finite resource that the first client network node was previously allowed to use in the network is assumed to be zero.

30. The method of claim 1, wherein the previously allocated first amount of the given type of finite resource that the first client network node was previously allowed to use in the network is assumed to be a default amount.

31. The method of claim 1, wherein the previously allocated first amount of the given type of finite resource that the first client network node was previously allowed to use in the network is indicated in the received first finite resource allocation request.

32. A finite resources allocation server for use in allocating finite resources to client network nodes in a network, the finite resources allocation server being configured to, at the finite resources allocation server:
determine a previously requested first amount of a given type of finite resource that a first client network node previously requested to use in the network;
determine a previously allocated amount of the given type of finite resource that was previously allocated, in response to the previous request, to the first client network node;
divide the determined previously allocated amount by the determined previously requested first amount to obtain an indication of a first previous proportion of the previously requested first amount that was previously allocated to the first client network node;
receive, from the first client network node, a first finite resource allocation request requesting a first amount of the given type of finite resource for use by the first client network node in the network;
first allocate, to the first client network node, a first allocated amount of the given type of finite resource that the first client network node is allowed to use in the network, wherein the first allocating allocates the first allocated amount based at least in part on:
the previously requested first amount of the given type of finite resource that the first client network node previously requested to use in the network,
the indication of the first previous proportion, and
an indication of a second previous proportion of a previously requested second amount of the given type of finite resource that a second client network node previously requested to use in the network that was previously allocated to the second client network node for use in the network;
receive, from the second client network node, a second finite resource allocation request requesting a second amount of the given type of finite resource for use by the second client network node in the network; and
second allocate, to the second client network node, a second allocated amount of the given type of finite resource that the second client network node is allowed to use in the network, wherein the second allocating allocates the second allocated amount based at least in part on:
the previously requested second amount of the given type of finite resource that the second client network node previously requested to use in the network, and
the indication of the second previous proportion of the previously requested second amount of the given type of finite resource that the second client network node previously requested to use in the network that was previously allocated to the second client network node for use in the network; and wherein the first allocating allocates the first allocated amount at least on the basis of the first previous proportion compared to the second proportion.

33. A computer program comprising a set of instructions which, when executed by a finite resources allocation server, cause the finite resources allocation server to allocate finite resources to client network nodes in a network by, at the finite resources allocation server:

determining a previously requested first amount of a given type of finite resource that a first client network node previously requested to use in the network;

determining a previously allocated amount of the given type of finite resource that was previously allocated, in response to the previous request, to the first client network node;

dividing the determined previously allocated amount by the determined previously requested first amount to obtain an indication of a first previous proportion of the previously requested first amount that was previously allocated to the first client network node;

receiving, from the first client network node, a first finite resource allocation request requesting a first amount of the given type of finite resource for use by the first client network node in the network;

first allocating, to the first client network node, a first allocated amount of the given type of finite resource that the first client network node is allowed to use in the network, wherein the first allocating allocates the first allocated amount based at least in part on:

the previously requested first amount of the given type of finite resource that the first client network node previously requested to use in the network, the indication of the first previous proportion, and an indication of a second previous proportion of a previously requested second amount of the given type of finite resource that a second client network node previously requested to use in the network that was previously allocated to the second client network node for use in the network;

receiving, from the second client network node, a second finite resource allocation request requesting a second amount of the given type of finite resource for use by the second client network node in the network; and second allocating, to the second client network node, a second allocated amount of the given type of finite resource that the second client network node is allowed to use in the network, wherein the second allocating allocates the second allocated amount based at least in part on:

the previously requested second amount of the given type of finite resource that the second client network node previously requested to use in the network, and the indication of the second previous proportion of the previously requested second amount of the given type of finite resource that the second client network node previously requested to use in the network that was previously allocated to the second client network node for use in the network; and wherein the first allocating allocates the first allocated amount at least on the basis of the first previous proportion compared to the second previous proportion.

* * * * *